US008543639B2

(12) United States Patent
Shankman

(10) Patent No.: US 8,543,639 B2
(45) Date of Patent: Sep. 24, 2013

(54) METHODS AND APPARATUS FOR COLLECTING AND TRANSFERRING INFORMATION OVER A NETWORK

(75) Inventor: Peter Shankman, New York, NY (US)

(73) Assignee: Vocus, Inc., Beltsville, MD (US)

(*) Notice: Subject to any disclaimer, the term of this patent is extended or adjusted under 35 U.S.C. 154(b) by 74 days.

(21) Appl. No.: 12/406,641

(22) Filed: Mar. 18, 2009

(65) Prior Publication Data
US 2010/0241685 A1 Sep. 23, 2010

(51) Int. Cl.
*G06F 15/16* (2006.01)
(52) U.S. Cl.
USPC ........... 709/203; 709/202; 709/206; 709/217; 709/218; 709/219
(58) Field of Classification Search
USPC .......................................................... 709/203
See application file for complete search history.

(56) References Cited

U.S. PATENT DOCUMENTS

| 6,064,978 | A  | * | 5/2000  | Gardner et al. | 705/10  |
|-----------|----|---|---------|----------------|---------|
| 6,223,165 | B1 | * | 4/2001  | Lauffer        | 705/8   |
| 7,418,437 | B1 | * | 8/2008  | Marks          | 1/1     |
| 2001/0049722 | A1 | * | 12/2001 | Bush           | 709/204 |
| 2002/0087520 | A1 | * | 7/2002  | Meyers         | 707/3   |
| 2006/0068818 | A1 | * | 3/2006  | Leitersdorf et al. | 455/466 |
| 2006/0074863 | A1 |   | 4/2006  | Kishore et al. |         |
| 2008/0021884 | A1 |   | 1/2008  | Jones et al.   |         |
| 2008/0071747 | A1 |   | 3/2008  | Bohannon et al. |        |
| 2009/0235084 | A1 | * | 9/2009  | Ferraro et al. | 713/182 |

OTHER PUBLICATIONS

International Search Report & Written Opinion, PCT/US09/37538, Mailed Apr. 23, 2009, 10 pages.
International Preliminary Report on Patentability issued Sep. 29, 2011 in connection with Application No. PCT/US2009/037538.

* cited by examiner

*Primary Examiner* — Noel Beharry
(74) *Attorney, Agent, or Firm* — Nutter McClennen & Fish LLP; David J. Powsner; Derek P. Roller

(57) ABSTRACT

In one aspect, the invention provides digital data processing methods and systems for collecting and transferring information, comprising one or more server digital data processors ("servers") that exchange information requests and, optionally, responses between a first set of client digital data processors and a second set of client digital data processors. The first set of those client devices accept input from persons seeking information, e.g., reporters, bloggers, detectives, etc., (collectively, "reporters") and, from that input, generate and transmit queries to the server(s). The server digital data processor, in turn, transmits those queries to the second set of client digital data processors, which display or otherwise convey the queries to persons that may have relevant information, e.g., industry professionals, public relations representatives, etc. (collectively, "sources"). Those second client devices route responses received from respective sources directly and/or indirectly (e.g., via the server(s)) to the client device of the "reporter" who inputted the request.

11 Claims, 2 Drawing Sheets ns, which display or otherwise convey the queries to persons that may have relevant information, e.g., industry professionals, public relations representatives, etc. (collectively, "sources"). Those second client devices route responses received from the respective sources directly and/or indirectly (e.g., via the servers) to the client device of the "reporter" who inputted the request.

METHODS AND APPARATUS FOR COLLECTING AND TRANSFERRING INFORMATION OVER A NETWORK

BACKGROUND OF THE INVENTION

The invention pertains to digital data processing and, more particularly, to methods and apparatus that utilize digital data processors and networks to facilitate the collection and transfer of information from persons who have that information to those who have requested it.

The Internet has revolutionized the manner in which information is distributed. Publishing houses and other media organizations rely on it to reach large audiences at a low cost. Individuals have benefited, as well, from rookie "bloggers" to well-credentialed pundits, all of who use this global network to reach millions of readers worldwide.

The Internet is not only a publication medium. It has also become one of the most widely used research sources. Websites such as Wikipedia are a regular stopping point of students and professionals doing research, often replacing more traditional resources, e.g., brick-and-mortar libraries.

Although the Internet represents a publication and research medium unparalleled in history, it provides no ready mechanism for bringing people who want specific items of information together with those who have it. Thus, for example, a journalist who uses the Internet to research a story must rely on a search engine to find web sites of potential interest and, then, must scour those sites for relevant nuggets of information. Even with the most advanced search engines, this is still a hit or miss proposition, at best.

Likewise, individuals who have information that is valuable to others may not know it. For example, a blogger who publishes daily on politics would not be expected to write anything in his blog about a traffic accident he witnessed. Yet, details about which car ran the red light or turned without a signaling might be of vital interest to a reporter or detective—perhaps, even one who regularly reads the political blog!

An object of the invention is to provide improved methods and apparatus for digital data processing.

A further object of the invention is to provide such methods and apparatus as utilize digital data processors and networks to facilitate the collection and transfer of information from persons who have that information to those who have requested it.

A related object of the invention is to provide such methods and apparatus as facilitate generating and distributing information queries, as well as returning relevant responses.

A further related object is to provide such methods and apparatus as facilitate the exchange of information between persons who have it and those who need it.

A still further object of the invention is to provide such methods and apparatus as facilitate news and other reporting.

SUMMARY OF THE INVENTION

In one aspect, the invention provides digital data processing methods and systems for collecting and transferring information. These comprise one or more server digital data processors ("server") that exchange information requests and, optionally, responses between a first set of client digital data processors and a second set of client digital data processors. The first set of those client devices accept input from persons seeking information, e.g., reporters, bloggers, detectives, etc., (collectively, "reporters") and, from that input, generate and transmit queries to the server. The server, in turn, transmits those queries to the second set of client digital data proces- In related aspects, the invention provides digital data processing methods and systems for collecting and transferring information as described above wherein the second client devices privately route responses received from the respective sources to the client device of the reporter who inputted the request. Thus, for example, although multiple sources may input responses to a common query received on their respective second client devices, those devices can route those respective responses privately—i.e., so that no source can view the response inputted by another source. Likewise, the responses are routed so that no reporter—other than the one who inputted the underlying query—can view responses received to that query.

In related aspects, the invention provides digital data processing methods and systems for collecting and transferring information as described above wherein the server transmits query responses received from a second client device to the first client device along with an identification (e.g., name, e-mail address, etc.) of the source who provided the information in that response. Conversely, in other aspects of the invention, the server can transmit those responses anonymously, e.g., without such identification.

In further related aspects, the invention provides digital data processing methods and systems for collecting and transferring information as described above wherein a second client device routes a query response to a first client device via a further server digital data processor, e.g., an e-mail server.

In yet further related aspects, the invention provides digital data processing methods and systems for collecting and transferring information as described above wherein the server compiles and transmits one or more queries to the second client digital data processors via any of e-mail, instant messaging, text messaging and voice messaging.

In further related aspects, the invention provides digital data processing methods and systems for collecting and transferring information as described above wherein the compiled information query comprises a plurality of queries generated by the first client digital data processors.

In other related aspects, the invention provides digital data processing methods and systems for collecting and transferring information as described above wherein the server digital data processor transmits advertisements to the second client digital data processors, along with one or more of the information queries.

These and other aspects of the invention are evident in the discussion below and the attached drawings.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
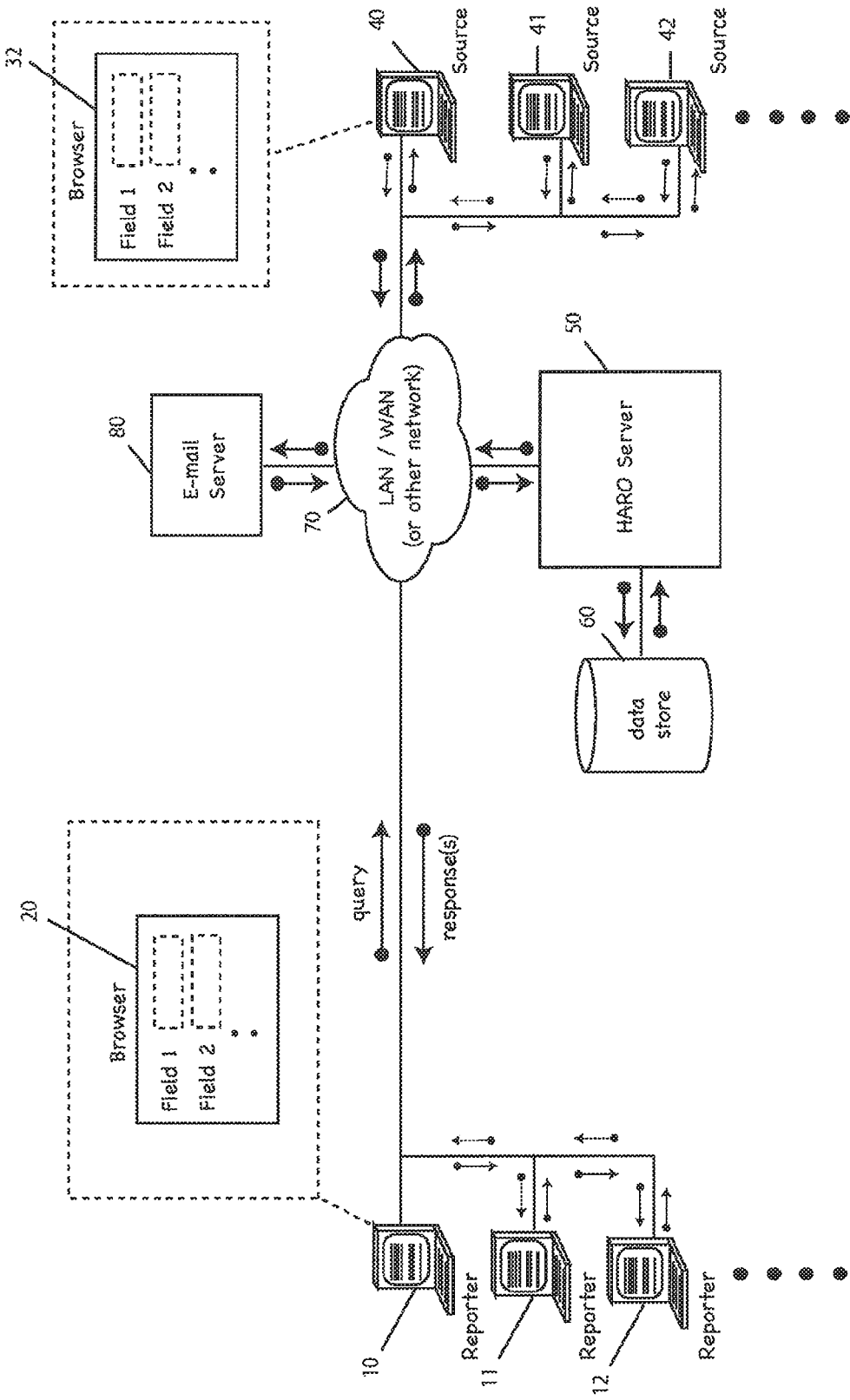
FIG. 1 depicts a digital data processing system and environment of the type used to practice the invention.

FIG. 1 depicts a digital data processing system according to one practice of the invention for facilitating the collection and transfer of information from persons ("sources") who have that information to those who have requested it ("reporters").

The illustrated system includes digital data processors 10-12, 40-42, 50 and 80, which may be personal computers, workstations, mainframes, servers, personal digital assistants (PDAs), smart phones, or other digital data processing apparatus of the type known in the art capable of executing applications, programs and/or processes and adaptable for operation in accord with the teachings hereof. Although eight such devices are shown and discussed here, those skilled in the art will appreciate that in other embodiments the system may include a greater or lesser number thereof.

Digital data processors 10-12, 40-42, 50 and 80 execute in a network environment, as illustrated. Thus, they can be coupled via a network 70, here, representing one or more of the Internet, a local-area-network (LAN), wide-area-network (WAN), public switched telephone network (PSTN), or other network media of the type known in the art, wired, wireless or otherwise.

In one embodiment, illustrated here, digital data processors 10-12 accept input from persons seeking information, e.g., reporters, bloggers, detectives, etc., (collectively, "reporters") and, from that input, generate and transmit information queries to server 50, discussed further below. By way of example, such queries can range from requests for topical information (e.g., product release-dates, etc.) to requests for potential interview sources (e.g., a social media expert), and so forth.

The digital data processors 10-12 each execute a query generator 20 that generates queries based on input from their respective users. In the illustrated embodiment, the query generator 20 may comprise a stand-alone application, or a conventional Internet browser (e.g., Internet Explorer, Firefox, Safari, etc.), albeit as adapted in accord with the teachings hereof.

Illustrated query generator 20 displays, by way of non-limiting example, form-fields via which a reporter inputs query information, such as (1) summary or subject of the requested information, (2) category of the requested information (e.g., business/finance, general, technology, travel, lifestyle/entertainment, healthcare, etc.), and (3) name, title, publication (e.g., New York Times Magazine, freelance, etc.) and/or contact information (e.g., e-mail address, telephone number, etc.) for the reporter responsible the query, just to name a few. In the illustrated embodiment, the query generator 20 transmits this information to the server 50 via HTTP requests (e.g., GET and/or POST operations) or otherwise (e.g., via e-mail, text message, instant message, etc.).

The illustrated server digital data processor 50 accepts queries from the client devices 10-12 and transmits those queries to the client devices 40-42. The server 50 can transmit the queries in the form they are received from the reporters (i.e., client devices 10-12) or it can abridge, supplement and/or reformat them, e.g., compiling multiple queries, converting HTML into plain text, and so forth. For example, in one embodiment of the invention, the server 50 transmits queries to the client devices 40-42 several times per day in the form of e-mail "blasts," each of which comprises a compilation of query information received by the server from devices 10-12 since the time of the last transmission to devices 40-42. Those e-mail blasts can be supplemented, e.g., with advertisements from sponsors of the enterprise that operates sever 50, sponsors of the reporters (or their respective enterprises), and so forth. Such advertising can be included in other transmittals to client devices 40-42, as well.

Illustrated digital data processors 40-42 execute response generators 32 that display or otherwise convey queries (and any accompanying information, e.g., advertisements) to their respective users, i.e., persons that may have relevant information, e.g., industry professionals, public relations representatives, etc. (collectively, "sources"). The response generators, additionally, accept input from those sources, and from that input, generate and transmit responses directly and/or indirectly (e.g., via the server 50) to the client device 10-12 of the reporter who requested the information. Like the query generators, the response generators 32 may comprise stand-alone applications, conventional Internet browsers adapted in accord with the teachings hereof, and so forth.

In some embodiments, the query generators 32 privately route responses input by respective sources to the first digital data processor of the reporter who input the request. Thus, for example, although multiple sources may input responses to a common query received on their respective second digital data processor, the query generators 32 can route those respective responses privately—i.e., so that no source can view the response input by another source. Likewise, the query generators 32 route responses so that no reporter—other than the one who input the underlying query—can view responses received to that query. This is in direct contrast to newsgroups, Internet forums, etc., which display both queries and responses to all users.

In some embodiments, response generators 32 display, by way of non-limiting example, form-fields via which a respective source can view received queries from the server and input response information, such as (1) identification of a query for which response information is being provided (e.g., I.D. of query, subject of query, etc.), (2) basis of source's knowledge (e.g., first-hand witness, heard from another), (3) substance of response (e.g., information sought by query), and (4) identity of source (optional). In some embodiments, the response generator 32 transmits this information to the server 50 via HTTP requests (e.g., GET and/or POST operations) for retransmittal to the client device 10-12 of the reporter who generated the original query. As above, such retransmittal can be in the form received from the client device 40-42 or it can be abridged, supplemented, reformatted, and so forth.

In one preferred embodiment, response generator 32 comprises an e-mail client that displays e-mail "blasts" comprising a compilation of queries generated by the server 50. Such an e-mail client can accept a reply from the respective source that includes information of the type specified above and can route that back to server 50, again, for retransmittal to the client device 10-12 of the reporter who generated the original query. (Such routing can be based, for example, on the I.D. received with the response, the subject of the query identified in the response, and so forth).

In the illustrated embodiment, the server 50 executes a routing engine for transmitting and routing queries and responses. To this end, the routing engine can maintain addresses, or other contact information, for sources and reporters (e.g., e-mail addresses, phone numbers, etc.) to which queries are to be transmitted and/or responses routed. By way of the further example, the query routing engine can maintain a repository of advertisements (e.g., text, picture, video, voice, etc.) which it can use to supplement queries transmitted to devices 40-42.

The illustrated system can further include server digital data processor 80 that is employed by response generator 32 of client devices 40-42 to route responses back to client devices, e.g., independent of server 50. In the illustrated embodiment, the server 80 comprises an e-mail (or other) server of the type commercially operated in the marketplace, e.g., the Google® gmail server. Responses sent by a generator 32 to server 80 are routed by it to processors 10-12, e.g., based on addressing information contained in HTML-encoded e-mail links in query "blasts" (or other queries) transmitted by server 50. Such links can be, for example, a conventional HTML "mail to:" link, or otherwise, and can additionally include encoded query IDs, or so forth.

Figure 2:
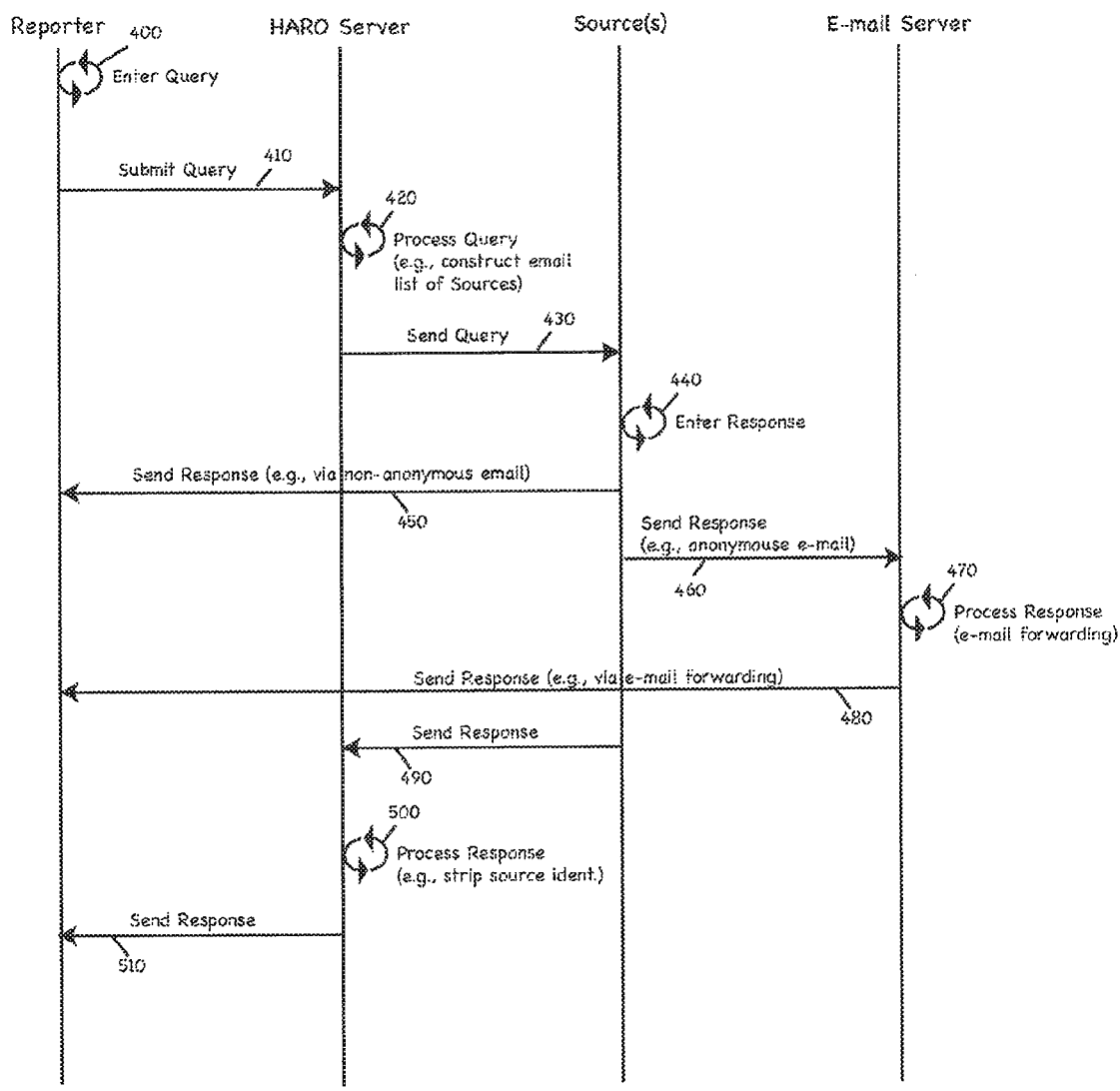
FIG. 2 depicts an operation of the system of FIG. 1.

FIG. 2 depicts a operation of a exemplary system for generating, transmitting and responding to queries according to one practice of the invention. The illustrated sequence of steps is just one of many with which the invention may be practiced. Thus systems according to the invention may use a greater or lesser number of steps than those shown here, ordered as shown in the drawing or otherwise.

In step 400, digital data processors 10-12 accept input from reporters (or other persons seeking information) via their respective query engines 20, and, from that input, generate information queries, as discussed above.

In step 410, the digital data processors 10-12 transmit queries via their respective query generators 20 to the server 50 over network 70, as discussed above.

In step 420, the server 50 receives and reformats queries sent from the digital data processors 10-12 in step 410. In the illustrated embodiment, this includes compiling multiple queries into a single query for transmission to the digital data processors 40-42, as discussed above. For example, a compiled query may comprise an e-mail having the original queries (i.e., those generated by the processors 10-12), in addition to advertisements that are selected by the server 50, e.g., from a repository maintained in data store 60. In the illustrated embodiment, advertisements are selected according to the to the type of information requested in the queries, although they need not be. By way of example, advertisements can be selected according to query categories (e.g., business/finance).

In step 430, the server sends the query transmitted in step 410, or a query compiled in step 420, to the digital data processors 40-42 for display to the sources. In the illustrated embodiment, the query is sent over network 70 (e.g., the Internet) via e-mail, although in other embodiments, it may be sent via text messaging, and so forth.

In step 440, digital data processors 40-42 display or otherwise convey queries to the sources. Additionally, the processors 40-42 accept input from sources with information relevant to a query sent in step 430, and from that input, generate responses. In the illustrated embodiment, this can include a source inputting information into form-fields of a web page, or preparing an e-mail utilizing an e-mail client.

Steps 450-510 comprise three alternative avenues for routing query responses to the digital data processing devices 10-12 of the reporter who inputted the respective query. In step 450, digital data processors 40-42 transmit non-anonymous responses to the digital data processors 10-12 of the reporters responsible for the respective queries. This can be via server 80 or otherwise. In alternate step 460, digital data processors 40-42 anonymously transmit responses to the digital data processors 10-12, again, via server 80 or otherwise. See also, steps 470 and 480. In alternate step 490, the digital data processors 40-42 transmit inputted responses via the server 50 itself. More specifically, for example, the server 50 may receive a response as an e-mail and forward it to the digital data processor 10-12 of the reporter who inputted the respective query. In the illustrated embodiment, the server 50 can route responses to the digital data processors 10-12 along with the identity of the respective source, or, alternatively, it may transmit the response anonymously. See also, steps 500 and 510.

Described above are methods and apparatus meeting the desired objectives. Those skilled in the art will appreciate that the embodiments herein are merely examples of the invention and that other embodiments incorporating changes therein fall within the scope of the invention. In view thereof, what I claim is:

In view of the foregoing, what I claim is:
1. A digital data processing system for collecting and transferring information, comprising:
   A. plural first digital data processors in communications coupling with one or more digital data processing servers,
   B. the plural first digital data processors each accepting input from one or more persons seeking information and, from that input, generating and transmitting respective information queries to the one or more digital data processing servers,
   C. the one or more digital data processing servers compiling a plurality of respective queries generated by the plural first digital data processors into a single compiled query and transmitting the compiled query to plural second digital data processors in communications coupling therewith, wherein the compiled query includes a plurality of respective queries from a plurality of first digital data processors,
   D. the plural second digital data processors each:
      (i) displaying or otherwise conveying the compiled query to one or more respective persons that may have relevant information,
      (ii) accepting input from a said respective person that may have relevant information to a respective query of said compiled query,
      (iii) generating a response to a said respective query based on that input, and
      (iv) transmitting the response to the one or more digital data processing servers, wherein the one or more digital data processing servers privately routes the response to the one or more first digital data processors that generated the respective queries so that no second digital data processor displays a response input by another second digital data processor.

2. The system of claim 1, wherein the one or more digital data processing servers transmits query responses received from a second digital data processor to a first digital data processor that generated the respective query, along with an identification of the person who provided the information in that response.

3. The system of claim 1, wherein the one or more digital data processing servers transmit query responses anonymously.

4. The system of claim 2, wherein the identification includes any of a name, e-mail address, physical address and phone number.

5. The system of claim 1, wherein the plural second digital data processors route query responses to a first digital data processor via one or more further digital data processing servers.

6. The system of claim 5, wherein the one or more further digital data processing servers comprise e-mail servers that anonymously forward query responses to the respective first digital data processors.

7. The system of claim 1, wherein the one or more digital data processing servers transmit one or more advertisements along with the information queries to the plural second digital data processors.

8. The system of claim 1, wherein the one or more digital data processing servers transmit queries to the plural second digital data processors via any of e-mail, instant message and text message.

9. The system of claim 1, wherein the plural first digital data processors transmit queries to the one or more digital data processing servers via any of e-mail, instant message and text message.

10. The system of claim 1, wherein the plural second digital data processors transmit query responses to the one or more first digital data processors via any of e-mail, instant message and text message.

11. A digital data processing system for collecting and transferring information, comprising:
  A. plural first digital data processors in communications coupling with one or more digital data processing servers,
  B. the plural first digital data processors each accepting input from one or more of reporters, bloggers, and detectives seeking information and, from that input, generating and transmitting respective information queries to the one or more digital data processing servers,
  C. the one or more digital data processing servers compiling a plurality of respective queries generated by the one or more first digital data processors into a single compiled query and transmitting the compiled query to plural second digital data processors in communications coupling therewith, wherein the compiled query includes a plurality of respective queries from a plurality of first digital data processors,
  D. the plural second digital data processors each:
    (i) displaying or otherwise conveying the compiled query to one or more respective sources that may have relevant information,
    (ii) accepting input from said respective sources that may have relevant information,
    (iii) generating a response to a said respective query of the compiled query based on that input, and
    (iv) transmitting the response to the one or more digital data processing servers, wherein the one or more digital data processing servers privately routes the response to the one or more first digital data processors that generated the respective queries so that no second digital data processor displays a response input by another second digital data processor.

* * * * *